Patented May 31, 1927.                                     1,630,300

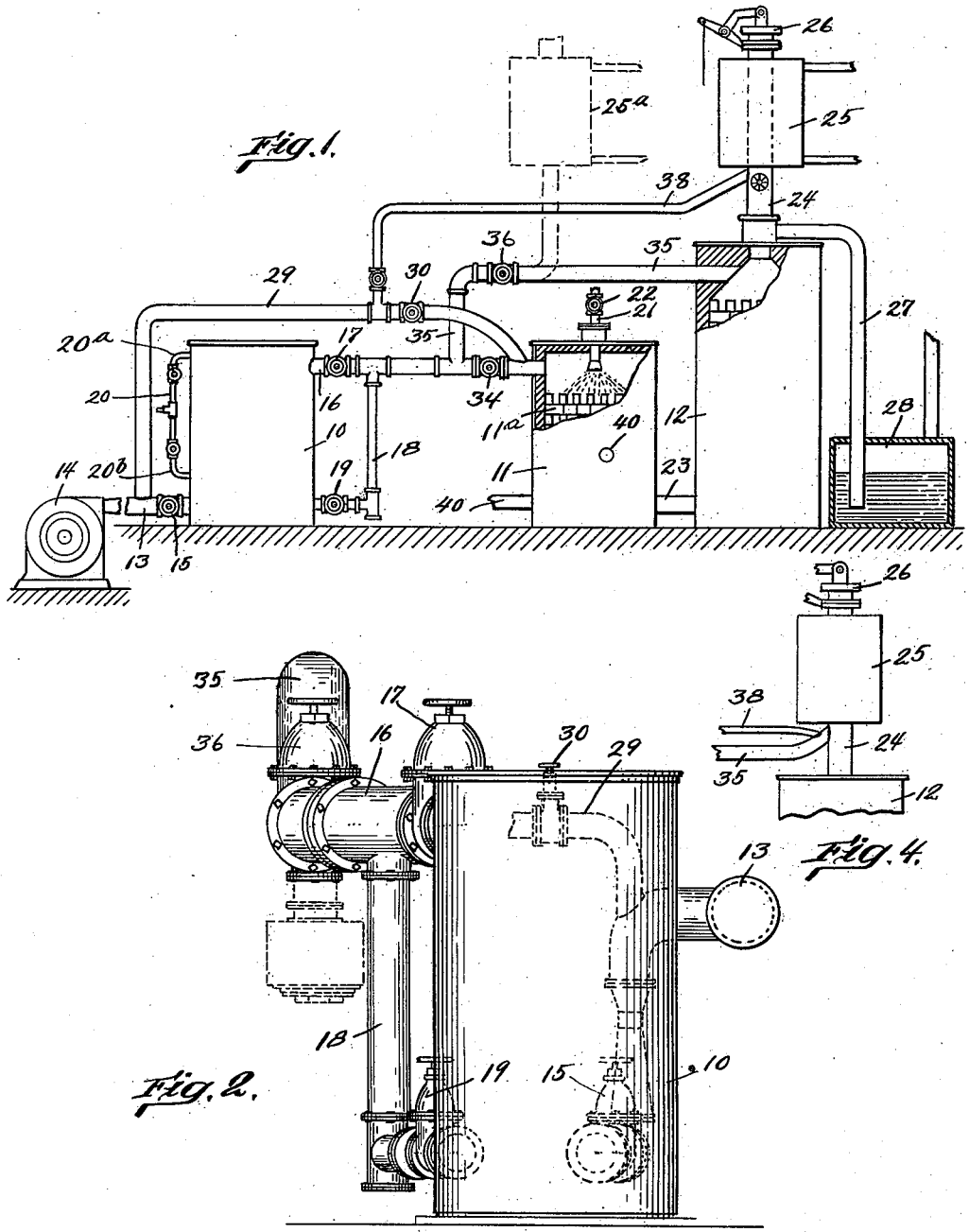

UNITED STATES PATENT OFFICE.

AUGUST C. KLEIN, OF JAMAICA PLAIN, MASSACHUSETTS, ASSIGNOR TO STONE & WEBSTER, INC., OF BOSTON, MASSACHUSETTS, A CORPORATION OF MASSACHUSETTS.

METHOD FOR MAKING CARBURETED WATER GAS.

Application filed February 26, 1921. Serial No. 448,059.

This invention relates to the manufacture of carbureted water gas and has particular reference to the manufacture of such gas in which a fuel having a relatively high coke depositing content is employed to enrich the gas.

Water gas, formed by forcing steam through a bed of highly heated carbonaceous fuel, such as coal or coke, is deficient in heating value and is usually enriched by adding to it gases formed by injecting an enriching fuel, as oil, into the water gas while in a highly heated carburetor. Certain enriching fuels, such as Californian and Mexican oils, have a tendency to deposit a relatively great amount of solid matter, comprising mainly carbon in the form of coke, on the brick checker work of the carburetor. The coke deposit, if allowed to remain, will gradually accumulate and clog up the gas passages through the carburetor and thereby reduce the efficiency of the carburetor; and furthermore, may result in the formation of a detrimental amount of carbon disulphide in the carbureted gas, if the fuel also contains an appreciable amount of sulphur, as is usually the case with the above named oils or if the water gas contains much hydrogen sulphide. The coke deposit in the carburetor may be removed, as by burning it out by passing air about the highly heated coke, at intervals, during which the gas making operation is suspended. The burning operation consumes time, however, and the amount of gas made by the apparatus during, say, a twenty-four hour period, is consequently reduced.

An object of this invention is a process of making carbureted water gas, and apparatus for working the process, in which the coke deposit is removed from the carburetor without interruption of the usual gas making cycle.

The process, briefly, consists in burning out the coke deposit at the same time the fuel in the generator is blasted or burned to restore it to the proper temperature to unite with the steam to form water gas.

A carbureted water gas making set embodying my invention may comprise a generator, carburetor and superheater and means whereby the gases resulting from blasting the generator may be conducted away from the generator without passing through the carburetor and superheater, and means for admitting air to the carburetor to unite with the coke deposit therein, and conducting the gases resulting from the coke burning operation through the carburetor and superheater to the atmosphere.

In the usual gas making set using an oil or other fuel having a substantial coke depositing content, the gases resulting from blasting the generator pass through the carburetor and superheater and heat both, and the heat resulting from the coke burning operation is mainly wasted.

A further object of this invention is to utilize effectively the heat resulting from the coke burning operation to heat the carburetor and superheater, and utilize the heat resulting from blasting the generator in a waste heat boiler to generate steam to operate the various steam consuming devices accessory to the gas making set.

Fig. 1 is a diagrammatic representation in elevation of a gas making set embodying my invention and adapted to operate in accordance with my process.

Fig. 2 is an end elevation of a gas making set embodying my invention.

Fig. 4 is a detail in elevation illustrating a modified arrangement of the apparatus adapted to conduct the generator blast gases directly into the furnace of the waste heat boiler.

Figure 3:
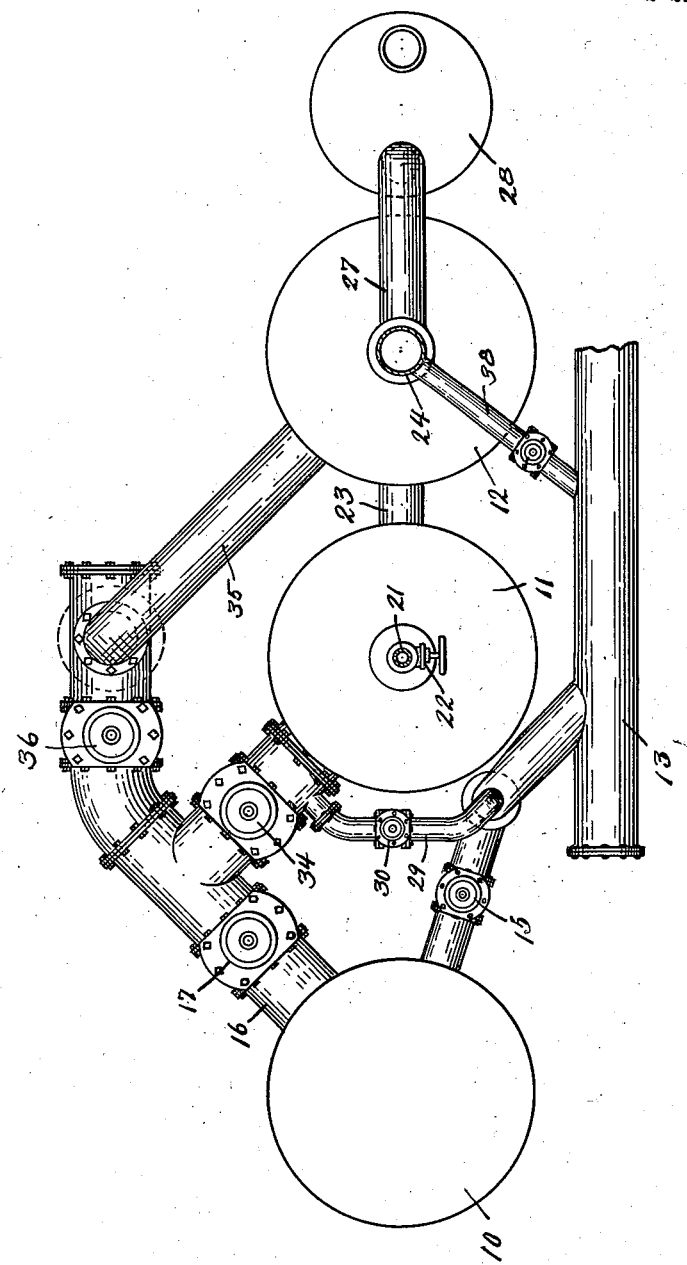
Fig. 3 is a plan view of the gas making set of Fig. 2.

As here shown, a carbureted water gas making set embodying my invention may comprise the water gas generator 10, carburetor 11, and superheater 12. The generator fuel bed is supplied with air for blasting through the pipe 13 from the blower 14, and the valve 15 is adapted to control the flow of blast air. Steam is supplied to the fuel in the generator through the steam pipe 20 having the valve-controlled upper and lower branches 20$^a$ and 20$^b$. A pipe 16 extends from the top of the generator to the top of the carburetor and has the valve 17 therein adjacent the generator. A second pipe 18 extends from the base of the generator to and in communication with said pipe 16, and has the valve 19 therein. An enriching fuel, such as oil, may be sprayed into the top of the carburetor, and onto the brick checker work 11$^a$ therein, through the pipe 21 having the control valve 22 therein. The carbureted water gas passes from the bottom of the carburetor through the pipe 23 into the bottom of the superheater. A stack pipe 24 extends from the top of the superheater, preferably through a waste heat boiler 25, to conduct waste gases to the atmosphere, and a stack valve 26 is arranged to close the stack pipe during a gas making run. The carbureted water gas passes from the top of the superheater through the pipe 27 and the water seal 28 to a gas holder, not shown. A carburetor air blast pipe 29 having a valve 30 extends from the blower 14 and is arranged to be in communication with the interior of the carburetor at the top, either directly or through the pipe 16, as shown.

The apparatus so far described is more or less the usual construction and is operated substantially as follows:

During a gas making run steam is forced from the steam pipe 20 through the highly heated fuel in the generator and unites therewith to form water gas, a mixture mainly of hydrogen and carbon monoxide. Blast valve 15 is closed and one of said valves 17 and 19 is closed and the water gas passes through the open valve and through pipe 16 into the carburetor. Oil is sprayed into the highly heated carburetor and the heat vaporizes and gasifies it, and the vapors and gases mix with the water gas. The mixture passes through the carburetor into the heated superheater. The temperature of the carburetor and superheater and the duration of the mixture therein is sufficient to convert substantially all of the oil vapors into fixed, or ordinarily incondensable gases, and the completely carbureted gas passes out of the superheater through the pipe 27 to a water gas holder, not shown. A gas making run ordinarily takes about four minutes.

The gas making process cools down the generator fuel bed and also the carburetor and superheater and is followed by a "blasting" period during which the steam and oil are turned off, the valve 19 is closed and air is forced through the generator fuel bed from the blower. Some of the fuel in the generator is burned to raise the temperature of the fuel bed. The gas formed is producer gas and containing a substantial amount of carbon monoxide. The hot producer gas is passed into the top of the carburetor through the pipe 16 and a blast of air is forced into the carburetor blast pipe 29 and unites with the producer gas.

The hot products of combustion flow through the carburetor and superheater and restore the temperature of both to the requisite degree and escape through the stack pipe 24 to the atmosphere. The time required for the blasting period is usually about three minutes; and the air blasting period is followed by a second gas making run.

When oil or other enriching fuel having a relatively high coke depositing content is sprayed into the carburetor a coke deposit, comprising mainly carbon, will collect on the brick checker work. The presence of a coke deposit is detrimental to the gas making process by reason of clogging the gas passages through the carburetor; by increasing the formation of carbon disulphide in the carbureted gas, as well as for other reasons.

It is possible to remove the coke deposit, as by burning it out by admitting air through the pipe 29 to the highly heated deposit at intervals, but the time required to remove the heavy deposit formed by oils having a high coke depositing content is considerable and during this time no gas can be made and, therefore, the twenty-four hour duty of the set is reduced.

In carrying out my invention, I provide means by which the generator may be blasted and the coke deposit in the carburetor simultaneously removed, as by burning, or blowing, or combined burning and blowing it out and, preferably, during each gas making cycle, so that no additional time is required to perform the gas making cycle and the duty of the set when using an enriching fuel having a high coke depositing content may be substantially equal to or even greater than that obtained when an oil having negligible coke depositing properties is used to enrich the gas.

For this purpose a valve 34 is installed adjacent the carburetor in the pipe 16 extending from the generator to the carburetor by which the carburetor may be isolated from the generator. A pipe 35 is connected with said pipe 16 between the valves 17 and 34 therein and serves to conduct the generator air blast gases directly to the atmosphere, preferably, however, having first passed through a waste heat boiler, as will hereinafter be set forth, but without passing through the carburetor and superheater checker brick. I may extend said pipe as shown in the dotted lines, Fig. 1, directly through a waste heat boiler 25$^a$ or I may extend said pipe into the top of the superheater, from which the generator blast gases will pass through the stack pipe 24 and the waste heat boiler 25 to the atmosphere.

In performing my new process, I close the valves 19 and 34 and open valve 17 and valve 36 in said pipe 35 and the blast valve 15. Air will be forced from the blower through the generator fuel bed and reheat it and the blast gases formed will pass through the pipe 35 directly to the stack, and without passing through the carburetor and superheater as heretofore. While the generator is being blasted I open the valve 30 in the carburetor blast pipe 29 and admit air to the carburetor thereby to burn off the highly heated coke deposit; and the highly heated products of combustion pass through the carburetor and superheater to the stack. The generator air blasting and coke burning operations, therefore, proceed simultaneously. The time required for burning off the coke deposit is usually less than that required for air blasting the generator and when the burning operation is finished the carburetor blast air may be turned off. When the air blasting of the generator fuel body is completed a new steam run will be begun. In view of the relatively long time available for the coke burning operation, I prefer to pass air at a relatively moderate rate through the carburetor and during, possibly, the entire blasting period, so that the air can search out and burn the coke deposit formed in crevices and on the underside of the bricks of the checker work not usually reached if the air is passed through at a relatively rapid rate.

Heretofore, when the coke deposit has been burned out of the carburetor, the heat resulting from the burning operation has been used to raise the temperature of the carburetor and superheater and the producer gas formed by the generator has been mainly wasted. By my new process and apparatus it is no longer necessary to make producer gas and therefore I may force air at a greater rate through the generator fire and burn it more nearly to carbon dioxide, and thereby with greater efficiency and consequently save generator fuel. By forcing the generator fire, I am enabled to raise the temperature of the fuel bed to the desired degree in a shorter time and so reduce the air blasting period and increase the duty of the set. The gases resulting from blasting the generator are passed through the waste heat boiler 25 and the heat in said gases is utilized to generate steam to operate the various steam consuming devices accessory to the gas making set; and the sensible heat of the gases resulting from the simultaneous coke burning operation also is utilized to raise steam in the waste heat boiler.

While I prefer to force the generator air blast at a greater rate than heretofore customary, and therefore burn the fuel more efficiently, nevertheless there may be an appreciable proportion of carbon monoxide formed, by reason of the thick bed of fuel. The carbon monoxide may be burned in the furnace of the waste heat boiler by admitting air to it through the pipe 38 or otherwise.

If found desirable, the pipe 35 may be placed directly in communication with the furnace of the waste heat boiler, as illustrated in Fig. 4, to conduct the generator blast gases directly therein without first passing into the top of the superheater.

If it is found that certain enriching fuels have so low a coke depositing content that the heat resulting from the coke burning operation does not raise the temperature of the carburetor and superheater sufficiently, the hot generator blast gases may be passed, or burned and passed through the carburetor and superheater to supply any additional heat necessary. If, on the other hand, the coke deposit is so great that an excessive carburetor and superheater temperature is reached, they may be cooled by forcing air therethrough from the carburetor blast pipe 29. With this arrangement I am enabled to regulate the temperature of the carburetor and superheater more closely than heretofore and thereby am enabled to produce better results in gasifying the fuel. In addition a coke deposit consuming medium, as air, steam, and the like, may be introduced into the carburetor at various points through the air pipes 40 to remove the coke deposit more effectively and admit of more effective regulation of the carburetor temperature.

I have herein used the term "burning" to include the removal of the coke deposit by air or steam or other coke-deposit removing or consuming gas.

I claim:

1. The method of making carbureted water gas in a gas making set comprising a water gas generator, a carburetor and a superheater, which consists in a gas making cycle consisting of the following steps: heating a fuel bed in the generator by blasting the generator with air and excluding the blast gases from the carburetor and simultaneously passing free air into the carburetor to burn out any carbon deposited therein in a previous gas making cycle and to heat the carburetor; stopping the generator blasting and carbon burning operations and admitting steam into the heated fuel in the generator to form water gas and passing the water gas into the heated carburetor; and admitting oil into the carburetor to enrich the water gas.

2. The improvement in the process of making carbureted water gas in a gas making set comprising a water gas generator, a carburetor, and a superheater, and from an oil having a substantial carbon depositing content; which consists in a gas making cycle which includes the step wherein the generator fuel bed is air blasted and the blast gases are withdrawn from the generator and are excluded from the carburetor and the carbon deposit in the carburetor is removed simultaneously by a blast of carbon-removing air, and another step wherein steam is passed into the generator to form water gas and the water gas is passed into the carburetor and the enriching fuel is introduced into the carburetor to enrich the water gas.

3. The improvement in the process of making carbureted water gas in a gas making set comprising a water gas generator, a carburetor, and a superheater, and from an oil having a substantial carbon depositing content; which consists in a gas making cycle which includes the step of air blasting the generator fuel bed and withdrawing the blast gases from the generator and excluding them from the carburetor and simultaneously burning out the carbon deposit in the carburetor; and the step wherein steam is passed through the generator to form water gas and the water gas is passed into the carburetor and the enriching fuel is introduced into the carburetor to enrich the water gas.

In testimony whereof, I have signed my name to this specification.

AUGUST C. KLEIN.